UNITED STATES PATENT OFFICE.

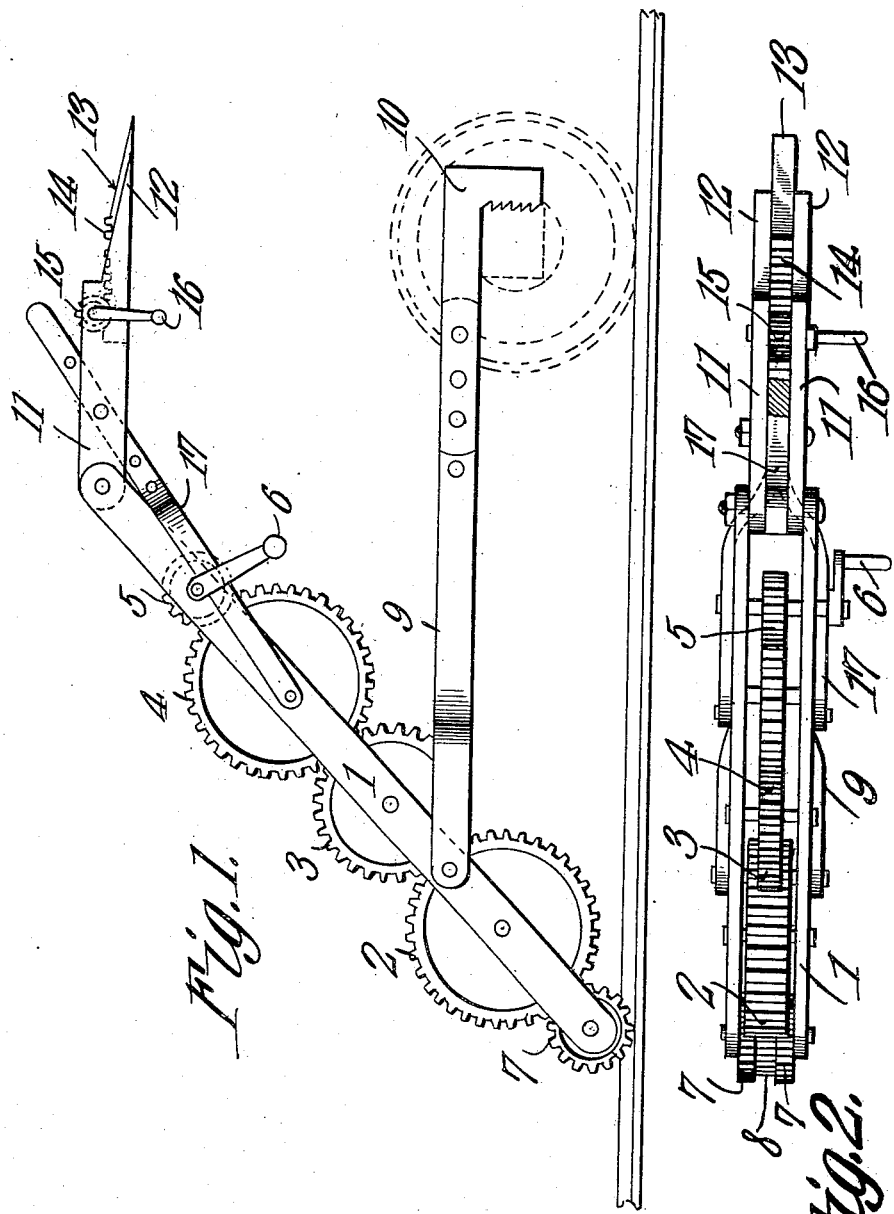

JOSEPH S. PEEK, OF KERRVILLE, TEXAS.

CAR-MOVER.

No. 891,856.　　　Specification of Letters Patent.　　　Patented June 30, 1908.

Application filed December 21, 1907. Serial No. 407,599.

*To all whom it may concern:*

Be it known that I, JOSEPH S. PEEK, a citizen of the United States, residing at Kerrville, in the county of Kerr and State of Texas, have invented a new and useful Car-Mover, of which the following is a specification.

This invention has relation to car movers and it consists in the novel construction and arrangement of its parts as hereinafter shown and described.

The object of the invention is to provide a simple and effective means for readily moving cars along tracks and at sidings and which may be manually operated with ease.

The mover consists primarily of a pair of beams between which is journaled a chain of meshing gear wheels which is operatively connected at one end with a crank shaft and at its other end with a rotating friction means for engaging a track rail. Means is provided for connecting the lower portions of the beams with the axle boxes of the car or the axle box frame and an adjustable means is provided for connecting the upper portions of the beams with the car sill or other parts of the superstructure of the car.

Figure 1 is a side elevation of the car mover, and Fig. 2 is a top plan view of the same.

The mover consists of the beams 1 between which are journaled the meshing gear wheels 2, 3, 4 and 5. The said gear wheels are preferably provided with ball bearings to reduce friction. The wheels 2 and 4 are of substantially the same diameter while the wheels 3 and 5 are of less diameter. The shaft upon which the wheel 5 is mounted is provided with a crank handle 6. The wheels 3, 4 and 5 are substantially of the same transverse thickness while the wheel 2 is of a greater transverse thickness. The pinions 7, 7 are journaled for rotation at the lower ends of the beams 1 and are connected together by the milled cylinder 8 which is less in diameter than the said pinions. Both of the pinions 7 mesh with the gear wheel 2. The tongue 9 is pivotally connected to the lower end portions of the beams 1 and the hook 10 is pivoted to the forward end of said tongue. The said hook is adapted to engage an axle box of the car or a portion of the axle box frame. The arm 11 is pivotally connected to the upper ends of the beams 1 and is provided with the pointed forward extremities 12 which are adapted to engage portions of the superstructure of the car.

A longitudinally adjustable bar 13 is mounted at the end of the arm 11 and is provided with a gear rack 14 which meshes with the gear wheel 15 mounted upon the crank shaft 16. The brace 17 is pivotally connected at its lower end to the beams 1 and is adjustably connected at its upper end portion with the arm 11 for the purpose of holding the same at a desired angle to the beams 1 to properly engage portions of the superstructure of the car.

The device is operated as follows: The milled cylinder 8 is placed upon the head of one of the track rails and the pinions 7 extend down along the opposite sides of the head of the rail. Thus the said pinions form flanges or guides for the cylinder 8. The hook 10 is then caught over any convenient part of the car truck and the ends 12 of the arm 11 are engaged with a portion of the superstructure of the car. In case the said ends 12 cannot properly engage a portion of the superstructure of the car by reason of intervening parts of the car body or attachments, such as couplings or train pipe connections, the bar 13 is adjusted longitudinally so as to engage the car body. The arm 11 is previously adjusted to present the parts that engage the car body at the proper angle thereto. When the parts are thus positioned it is obvious that by turning the crank shaft 6 rotary movement will be transmitted through the gear wheels 5, 4, 3 and 2 to the pinions 7 which in turn will rotate the cylinder 8. As the said cylinder 8 is in frictional contact with the head of the rail the car will be moved or pushed in advance of the mover.

Having described my invention, what I claim as new and desire to secure by Letters Patent is:

A car mover comprising beams, a rotatable track engaging means attached to the beams, means for connecting the lower portions of the beams with the car truck, an arm pivotally connected with the upper portions of the beams and a longitudinally adjustable bar attached to said arm.

In testimony that I claim the foregoing as my own, I have hereto affixed my signature in the presence of two witnesses.

JOSEPH S. PEEK.

Witnesses:
　JAS. HOLLISSON,
　MCCOLLUM BURNETT.